Patented Oct. 2, 1928.

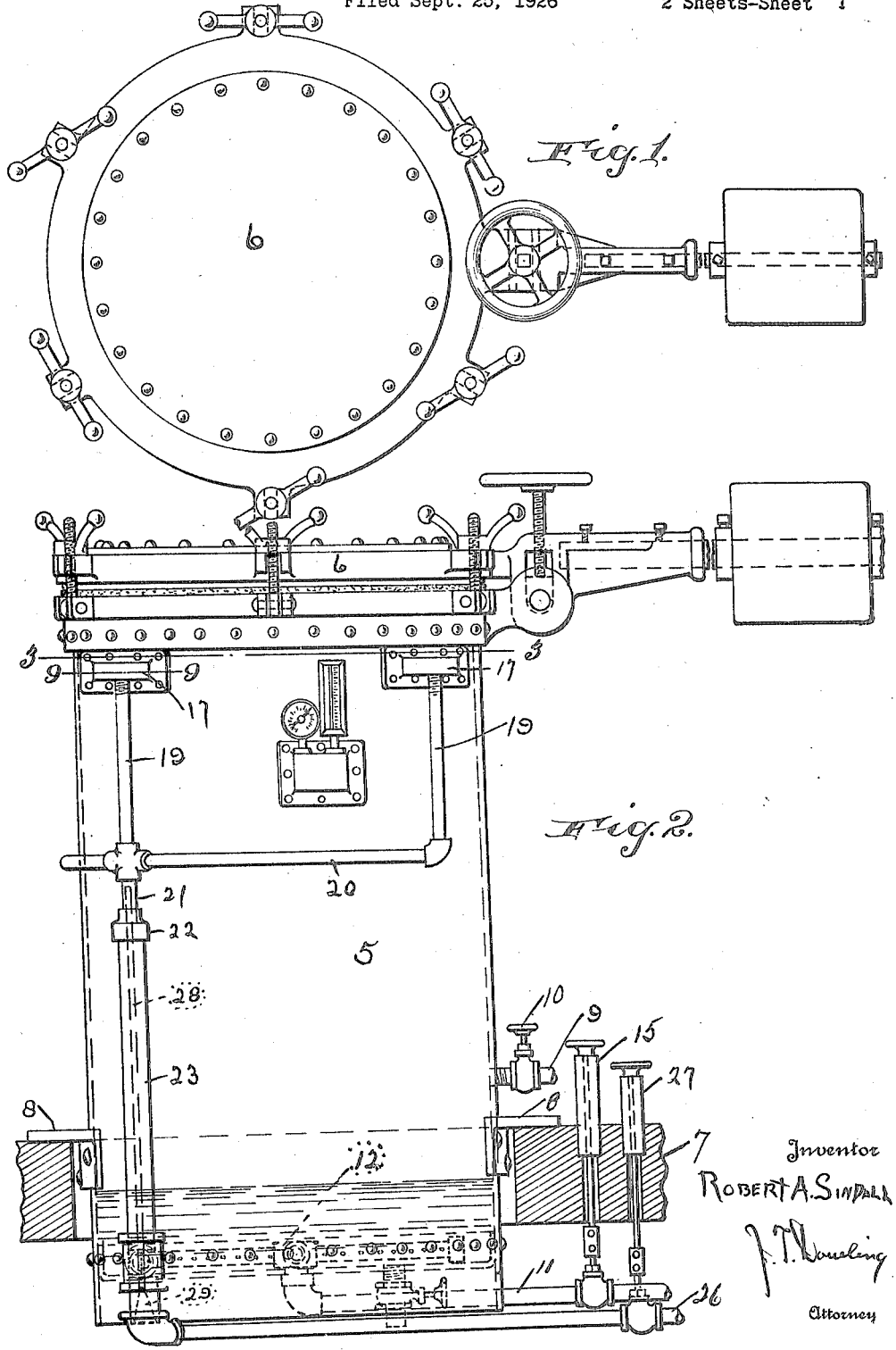

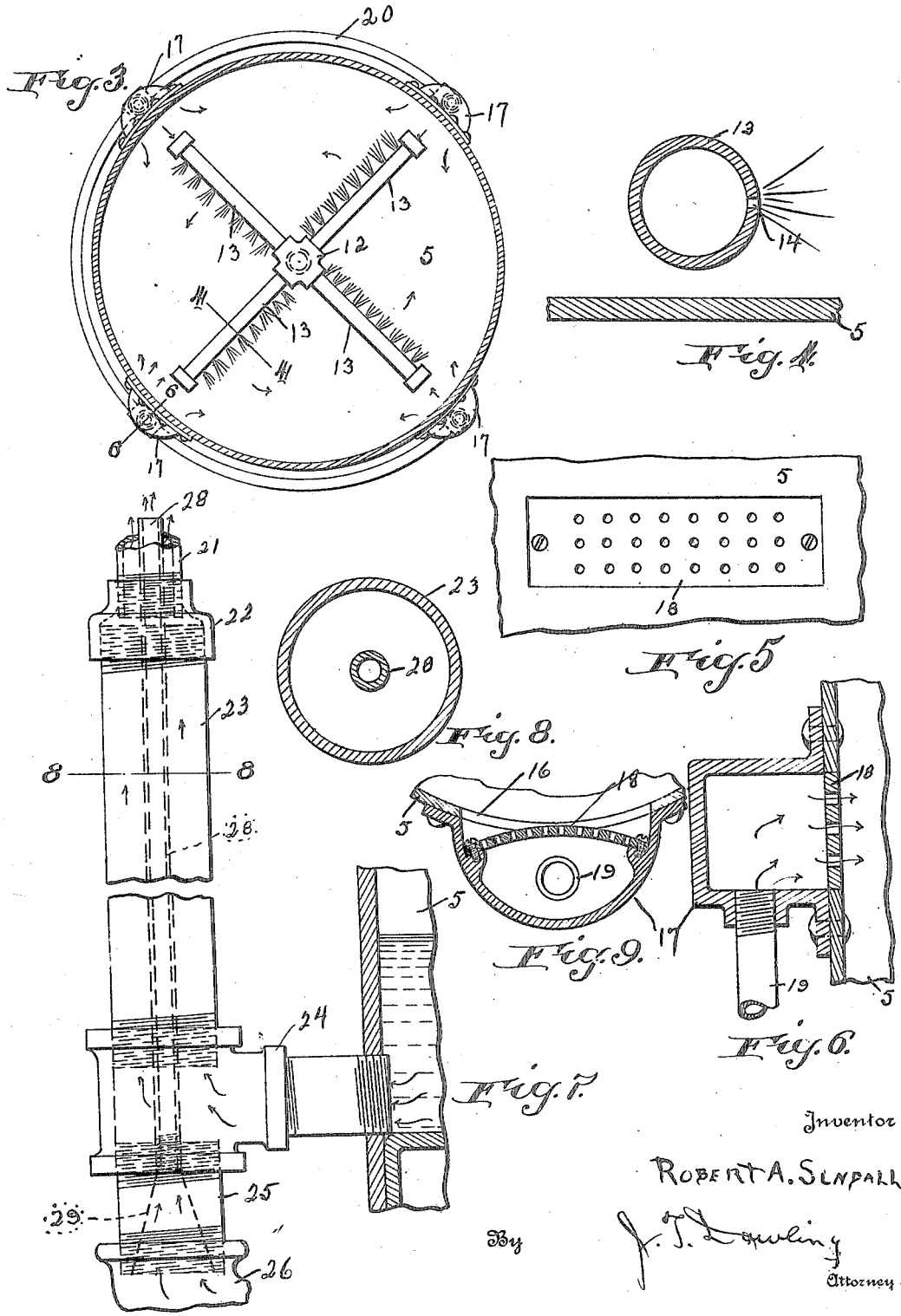

1,685,884

UNITED STATES PATENT OFFICE.

ROBERT A. SINDALL, OF BALTIMORE, MARYLAND, ASSIGNOR, BY MESNE ASSIGNMENTS, TO MAVIS BOTTLING COMPANY OF AMERICA, OF BALTIMORE, MARYLAND, A CORPORATION OF DELAWARE.

SPRAY ATTACHMENT FOR RETORTS.

Application filed September 25, 1926. Serial No. 137,802.

This invention relates to certain new and useful improvements in cooking retorts and has for its particular object the provision of a temperature regulating device capable of accurately keeping the contents of the receptacle at an even temperature throughout the entire area.

A further object of this invention is the provision of a retort equipped with a novel temperature regulating means embodying a spraying system whereby hot or cold fluids may be sprayed on the contents of the retort to keep such contents at predetermined temperatures.

A still further object of the invention is the provision of a spraying temperature regulator capable of being secured to a retort so that the contents of said retort may have the same temperature throughout the entire depth and area of said retort.

With these and other objects in view, the invention consists in certain novel features, combination and arrangement of parts as will be hereinafter more fully described, pointed out in the accompanying drawings, and claimed.

In the drawings,

Figure 1 is a top plan view of a retort, to which my invention is applied;

Figure 2 is a side elevational view, parts in dotted line and section, illustrating the invention as applied to a retort;

Figure 3 is a transverse sectional view taken on the line 3—3 of Figure 2;

Figure 4 is a transverse sectional view taken on the line 4—4 of Figure 3;

Figure 5 is a front elevational view of the spraying plate, showing a fragmentary portion of the retort vessel;

Figure 6 is a longitudinal detailed sectional view taken on the line 6—6 of Figure 3;

Figure 7 is an enlarged fragmentary detailed view, partly in section, illustrating the temperature regulating spraying device;

Figure 8 is a transverse sectional view taken on the line 8—8 of Figure 7; and,

Figure 9 is a transverse sectional view taken on the line 9—9 of Figure 2.

Referring to the drawings, the numeral 5 indicates a vessel or kettle of a retort equipped with a vacuum closing cover 6, this vessel 5 being mounted in a suitable support 7 and held thereto by suitable brackets 8. The vessel 5 is provided adjacent its bottom end with a water inlet 9, controlled by a suitable valve 10, and as this structure shows a common retort, it is to be understood that it plays no part in the invention other than as shown, as any type of retort vessel or kettle can be employed with my invention.

The vessel 5 has extending through its bottom wall and communicating with the interior thereof, a steam feed pipe 11, to the inner end of which is secured a spray head 12, this spray head being composed of cross pipes 13, and one side face of each cross pipe is provided with a plurality of spaced spraying openings 14, and the openings 14 of each pipe are on the side face remote from the adjacent pipe, so that a continuous circular spray may be provided around the entire circumference of the kettle or vessel 5.

The spraying head 12, which composes this pipe and is called a spraying head to avoid confusion, is located adjacent the bottom wall of the kettle or vessel 5, the purpose of which will be hereinafter more fully described.

The pipe 11 is controlled by a valve 15, so as to regulate the amount of fluid entering therein, to pass out through the spray head 12 into the receptacle or vessel 5.

The kettle or vessel 5 is provided adjacent its upper open end with a plurality of relatively spaced openings 16, which openings are closed exteriorly of the kettle by housings 17, and secured in each housing 17 is a spraying plate 18, which spraying plate is concavo-convex in cross section, the convex portion thereof being interiorly arranged.

Each of the housings 17 has connected thereto, a vertical fluid conducting pipe 19, the lower end of which pipe is connected to a circular feed pipe 20, which pipe 20 encircles the circumference of the vessel or kettle 5.

To provide means for conducting the temperature regulating fluid through the pipes 19 and 20 to the spray plates 18 of the vessel 5, I provide a feed pipe 21, which is secured by a bushing 22 to a casing 23, the lower end of the casing being secured in a T-coupling 24, the opposite end of which coupling has secured thereto a bushing 25, which in turn is connected to a steam feed pipe 26, the pipe 26 being controlled by a suitable valve 27.

Located centrally within the casing 23, is an injector tube 28, on the lower end of which is connected an injector nozzle 29, which is located in the bushing 25. Thus, when a temperature regulating fluid is forced through pipe 26, it is conveyed into the nozzle 29, up through injector tube 28, into pipe 21, through pipe 20 into pipes 19, through spraying plates 18 to the interior of the vessel or kettle 5.

The suction action of the steam leaving the injector nozzle 29 at a point adjacent the pipe 20, creates a vacuum in casing 23, which vacuum will draw any water from the bottom of the vessel or kettle 5 up therethrough, to be discharged through the plates 18. this water necessarily being the condensation of the steam previously sprayed through spraying head 12 and plates 18.

The invention is particularly adapted for equalizing the temperature of the bottles or other containers in the retort 5, and preferably steam is used so as to cause an even hot temperature, both at the bottom and top of the retort at all times, through the medium of the feed pipes 11 and 26 controlled by the valves 15 and 27.

It is to be understood that certain minor changes may be resorted to without departing from the spirit and scope of the invention as claimed.

Having thus described my invention, what I claim as new is:

1. A temperature regulating spraying device for retorts, including a vessel having a cover therefor, a spraying head secured in said vessel, a feeding means for said spraying head, spraying plates secured adjacent the upper end of said receptacle, feeding means for said spraying plates, and an injector vacuum forming means secured in said last named feeding means as and for the purpose specified.

2. A temperature regulating spraying device for retorts, comprising a vessel having a cover, means for sealing the cover to the vessel to create a vacuum, a spraying head secured in said vessel adjacent the lower end, a feeding means for said spraying head, a plurality of spraying plates secured in the vessel adjacent the upper end thereof, feeding means for said plates, said plates being substantially concavo-convex in cross section to provide circular spray when the feeding means are open, and an injector vacuum forming means secured to the plate feeding means whereby the condensation of the vessel may be utilized.

In testimony whereof I hereunto affix my signature.

ROBERT A. SINDALL.